US012335508B2

(12) United States Patent
Meardi et al.

(10) Patent No.: US 12,335,508 B2
(45) Date of Patent: Jun. 17, 2025

(54) RESIDUAL FILTERING IN SIGNAL ENHANCEMENT CODING

(71) Applicant: V-NOVA INTERNATIONAL LIMITED, London (GB)

(72) Inventors: Guido Meardi, London (GB); Lorenzo Ciccarelli, London (GB)

(73) Assignee: V-NOVA INTERNATIONAL LIMITED, London (GB)

( * ) Notice: Subject to any disclaimer, the term of this patent is extended or adjusted under 35 U.S.C. 154(b) by 190 days.

(21) Appl. No.: 17/441,034

(22) PCT Filed: Feb. 28, 2020

(86) PCT No.: PCT/GB2020/050492
§ 371 (c)(1),
(2) Date: Sep. 20, 2021

(87) PCT Pub. No.: WO2020/188237
PCT Pub. Date: Sep. 24, 2020

(65) Prior Publication Data
US 2022/0159250 A1  May 19, 2022

(30) Foreign Application Priority Data

Mar. 20, 2019 (GB) ...................................... 1903844
Mar. 23, 2019 (GB) ...................................... 1904014
(Continued)

(51) Int. Cl.
*H04N 19/503* (2014.01)
*H04N 19/109* (2014.01)
(Continued)

(52) U.S. Cl.
CPC ......... *H04N 19/503* (2014.11); *H04N 19/109* (2014.11); *H04N 19/117* (2014.11);
(Continued)

(58) Field of Classification Search
CPC .... H04N 19/117; H04N 19/157; H04N 19/86; H04N 19/176; H04N 19/172;
(Continued)

(56) References Cited

U.S. PATENT DOCUMENTS 8,964,854 B2   2/2015  Tu et al.
9,106,920 B2 *  8/2015  Rusert .................... H04N 19/36
(Continued)

FOREIGN PATENT DOCUMENTS

EP       2090108       6/2013
EP       3255890       12/2017
(Continued)

OTHER PUBLICATIONS

H. Schwarz et al: "Overview of the Scalable Video Coding Extension of the H.264/AVC Standard", IEEE Transactions On Circuits and Systems for Video Technology, vol. 17, No. 9, Sep. 1, 2007 (Sep. 1, 2007), pp. 1103-1120, XP055378169, US ISSN: 1051-8215, DOI: 10.1109/TCSVT.2007.905532.
(Continued)

*Primary Examiner* — Masum Billah
(74) *Attorney, Agent, or Firm* — Workman Nydegger

(57) ABSTRACT

According to aspects of the invention there is provided a method of encoding an input signal, the method comprising: producing a base encoded signal by feeding an encoder with a downsampled version of an input signal; producing a first residual signal by: obtaining a decoded version of the base encoded signal; and using a difference between the decoded version of the base encoded signal and the downsampled version of the input signal to produce a first residual signal; encoding the first residual signal to produce a first encoded residual signal; producing a second residual signal by: decoding the first encoded residual signal to produce a first decoded residual signal; filtering the first decoded residual
(Continued)

signal to produce a filtered version of the first decoded residual signal; correcting the decoded version of the base encoded signal using the filtered version of the first decoded residual signal to create a corrected decoded version; upsampling the corrected decoded version; and using a difference between the corrected decoded signal and the input signal to produce the second residual signal; and encoding the second residual signal to produce a second encoded residual signal, wherein the base encoded signal, the first encoded residual signal and the second encoded residual signal comprise an encoding of the input signal. An encoder, decoder and computer readable media may also be provided.

20 Claims, 6 Drawing Sheets

(30) Foreign Application Priority Data

| Mar. 29, 2019 | (GB) | ................................ | 1904492 |
|---|---|---|---|
| Apr. 15, 2019 | (GB) | ................................ | 1905325 |

(51) Int. Cl.

| H04N 19/117 | (2014.01) |
|---|---|
| H04N 19/122 | (2014.01) |
| H04N 19/124 | (2014.01) |
| H04N 19/13 | (2014.01) |
| H04N 19/132 | (2014.01) |
| H04N 19/136 | (2014.01) |
| H04N 19/172 | (2014.01) |
| H04N 19/176 | (2014.01) |
| H04N 19/177 | (2014.01) |
| H04N 19/18 | (2014.01) |
| H04N 19/184 | (2014.01) |
| H04N 19/30 | (2014.01) |
| H04N 19/44 | (2014.01) |
| H04N 19/60 | (2014.01) |
| H04N 19/82 | (2014.01) |

(52) U.S. Cl.
CPC ......... *H04N 19/122* (2014.11); *H04N 19/124* (2014.11); *H04N 19/13* (2014.11); *H04N 19/132* (2014.11); *H04N 19/136* (2014.11); *H04N 19/172* (2014.11); *H04N 19/176* (2014.11); *H04N 19/177* (2014.11); *H04N 19/18* (2014.11); *H04N 19/184* (2014.11); *H04N 19/30* (2014.11); *H04N 19/45* (2014.11); *H04N 19/60* (2014.11); *H04N 19/82* (2014.11)

(58) Field of Classification Search
CPC ........ H04N 19/70; H04N 19/61; H04N 19/82; H04N 19/44; H04N 19/46; H04N 19/119; G10L 19/00; G10L 19/0017
USPC ........................................................ 375/240
See application file for complete search history.

(56) References Cited

U.S. PATENT DOCUMENTS

| 2003/0067637 | A1 | 4/2003 | Hannuksela |
|---|---|---|---|
| 2004/0042549 | A1 | 3/2004 | Huang et al. |
| 2006/0165304 | A1 | 7/2006 | Lee et al. |
| 2011/0261888 | A1 | 10/2011 | Cammas et al. |
| 2012/0183076 | A1 | 7/2012 | Boyce |
| 2013/0044813 | A1 | 2/2013 | Boon |
| 2013/0272406 | A1 | 10/2013 | Yu |
| 2014/0219346 | A1* | 8/2014 | Ugur ..................... H04N 19/58 375/240.12 |
| 2014/0226718 | A1* | 8/2014 | Tu .......................... H04N 19/63 375/240.12 |
| 2017/0127085 | A1 | 5/2017 | Sun et al. |
| 2018/0115778 | A1* | 4/2018 | Rossato ................ H04N 19/85 |
| 2019/0313109 | A1* | 10/2019 | Handford ............... H04N 19/30 |

FOREIGN PATENT DOCUMENTS

| GB | 2553556 A | 3/2018 |
|---|---|---|
| JP | H11289542 | 10/1999 |
| JP | 2014132759 | 7/2014 |
| WO | 2006-039382 | 4/2006 |
| WO | 2010-127692 | 11/2010 |
| WO | 2013-171173 | 11/2013 |
| WO | 2018-068744 | 4/2018 |

OTHER PUBLICATIONS

International Search report and Written Opinion for PCT/GB2020/050492 dated May 25, 2020.
Search & Examination for GB2312636.0 dated Sep. 28, 2023.
Ferrara S et al: "[LCEVC]—CE2 Report", 127. MPEG Meeting; Jul. 8, 2019-Jul. 12, 2019; Gothenburg; (Motion Picture Expert Group or ISO/IEC JTC1/SC29/WG11), No. m49254, Jul. 3, 2019 (Jul. 3, 2019), XP030207545, Retrieved from the Internet: URL: http://phenix.int-evry.fr/mpeg/doc end_user/documents/127_Gothenburg/wg11/m49254.vl-m49254-CoreExperiment2-v.1.zip m49254 - Core Experiment 2 - v.1.docx [retrieved on Jul. 3, 2019].
Ferrara S et al: "[LCEVC]—Suggested improvements to LCEVC CD", 129, MPEG Meeting; Jan. 13, 2020-Jan. 18, 2020; Brussels; (Motion Picture Expert Group or ISO/IEC JTC1/SC29/WG11), No. m52269, Jan. 12, 2020 (Jan. 12, 2020), XP030224869, Retrieved from the Internet: URL: http://phenix.int-evry.fr/mpeg/doc_end_user/documents/129_Brussels/wg11/m52269-v2-m52269-%5BLCEVC%5DSuggestedimprovementstoLCEVCCDtext-v.1.zip Annex B - CD - Nov. 5, 2019,—v.2.0—Comments.docx [retrieved on Jan. 12, 2020].
"Working Draft of Low Complexity Enhancement Video Coding", 126. MPEG Meeting; Mar. 25, 2019-Mar. 29, 2019; Geneva; (Motion Picture Expert Group or ISO/IEC JTC1/SC29/WG11), No. n18454, Apr. 18, 2019 (Apr. 18, 2019), XP030208724, Retrieved from the Internet: URL: http://phenix.int-evry.fr/mpeg/doc_end_user/documents/126_Geneva/wg11/w18454.zipN18454.docx [retrieved on Apr. 18, 2019].
GB2312647.7 Search and Examination Report dated Sep. 7, 2023.
GB2312674.1 Search and Examination Report dated Oct. 10, 2023.
GB2312680.8 Search Report dated Oct. 5, 2023.
GB2312670.9 Search & Exam report dated Sep. 12, 2023.
GB2312675.8 Search & Exam report dated Sep. 12, 2023
International Preliminary Report on Patentability received for PCT Patent Application No. PCT/GB2020/050492, mailed on Sep. 30, 2021, 10 pages.
Heiko Schwarz, et al., "Chapter 3: Block Structures and Parallelism Features in HEVC", In: "High Efficiency Video Coding (HEVC)", Aug. 23, 2014, Springer International Publishing, XP055614176, ISBN: 978-3-319-06894-7, pp. 49-90, DOI: 10.1007/978-3-319-06895-4_3, section 3.3.2.
Office Action received for EA Patent Application No. 202192481, mailed on Dec. 20, 2022, 14 pages (2 pages of English Translation and 12 pages of Original Document).
Office Action received for EA Patent Application No. 202192481, mailed on Jul. 24, 2023, 18 pages (9 pages of English Translation and 9 pages of Original Document).
Office Action received for GB Patent Application No. 2114967.9, mailed on Aug. 23, 2022, 2 pages.
Office Action received for GB Patent Application No. 2114967.9, mailed on Mar. 21, 2023, 3 pages.
Office Action received for Indian Patent Application No. 202127047478, mailed on Feb. 20, 2023, 7 pages.

* cited by examiner (Encoder)

FIG. 2 (Decoder)

FIG. 3 (Encoder)

FIG. 4 (Decoder)

RESIDUAL FILTERING IN SIGNAL ENHANCEMENT CODING

CROSS-REFERENCE TO RELATED APPLICATIONS

The present application is a 371 US Nationalization of International Patent Application No. PCT/GB2020/050492, filed Feb. 28, 2020, which claims priority to UK Patent Application Nos: 1903844.7, filed Mar. 20, 2019, 1904014.6, filed Mar. 23, 2019, 1904492.4, filed Mar. 29, 2019, and 1905325.5, filed Apr. 15, 2019. The disclosures of the aforementioned applications are incorporated herein by reference in their entireties.

BACKGROUND

A hybrid backward-compatible coding technology has been previously proposed, for example in WO 2014/170819 and WO 2018/046940, the contents of which are incorporated herein by reference.

The coding technology is a flexible, adaptable, highly efficient and computationally inexpensive coding format which combines a video coding format, a base codec, (e.g. AVC, HEVC, or any other present or future codec) with an enhancement level of coded data, encoded using a different technique.

The technology uses a downsampled source signal encoded using a base codec to form a base stream. An enhancement stream is formed of an encoded set of residuals which correct or enhance the base stream for example by increasing resolution or by increasing frame rate. There may be multiple levels of enhancement data in a hierarchical structure. It is worth noting that typically the base stream is expected to be decodable by a hardware decoder while the enhancement stream is expected to be suitable for software processing implementation with suitable power consumption.

It is desired to apply the hybrid backward-compatible coding technology in a manner that produces a high-quality reconstructed signal with minimal image artefacts.

SUMMARY OF THE INVENTION

According to aspects of the invention there is provided a method of encoding and decoding a signal. The method comprises filtering decoded residuals by applying a filter or mask to improve picture quality and reduce block effects. Preferably the filter or mask is a deblocking filter which includes weighting the borders of blocks of inversely transformed residuals on specific pathways.

There is provided a method, computer program, computer-readable medium, and encoder as set out in the appended claims.

According to a first aspect of the invention, there is provided a method of encoding an input signal, the method comprising: producing a base encoded signal by feeding an encoder with a downsampled version of an input signal; producing a first residual signal by: obtaining a decoded version of the base encoded signal; and using a difference between the decoded version of the base encoded signal and the downsampled version of the input signal to produce a first residual signal; encoding the first residual signal to produce a first encoded residual signal; producing a second residual signal by: decoding the first encoded residual signal to produce a first decoded residual signal; filtering the first decoded residual signal to produce a filtered version of the first decoded residual signal; correcting the decoded version of the base encoded signal using the filtered version of the first decoded residual signal to create a corrected decoded version; upsampling the corrected decoded version; and using a difference between the corrected decoded signal and the input signal to produce the second residual signal; and encoding the second residual signal to produce a second encoded residual signal, wherein the base encoded signal, the first encoded residual signal and the second encoded residual signal comprise an encoding of the input signal.

The filtering is applied to improve picture quality of residuals and reduce blocking effects. These may sometimes occur when block-based transformations are applied at low resolutions. Note the filter is applied to a decoded version of a set of encoded residuals rather than the encoded or reconstructed picture signal. Since the residuals are later used in the architecture, any artefacts, block effects or visible block structures may have an exacerbated effect of the overall picture quality as the residuals have a transformative effect on the base signal and any changes resulting from the combination of residuals and base signal propagate through the architecture and are unlikely to be compensated for in the output signal. Preferably the filter operates on each block of transformed (or inverse transformed) residuals by applying a mask to each block.

The step of producing a first residual signal may comprise: quantizing the first residual signal to produce a first quantized residual signal and the step of decoding the first encoded residual signal comprises de-quantizing the first quantized residual signal. Thus, the mask may operate on quantized information to improve quality of that information.

In an implementation, the first residual signal may comprise a plurality of N×N data blocks and wherein encoding the first residual signal may comprise: transforming the first residual signal on a block-by-block basis, wherein decoding the first encoded residual signal may comprise: performing an inverse transform on N×N data blocks of a signal derived from the first encoded residual signal to produce the first decoded residual signal, and wherein filtering the first decoded residual signal may comprise: applying an N×N mask to each data block of the first decoded residual signal. Thus, the effects introduced by the transform may be mitigated for by the mask. Typically, the filter is applied to reduce effects of blocking in a low-resolution signal which are significantly pronounced by a subsequent upsampling step which causes the artefacts to propagate through the pipeline and into the high-resolution signal.

Optionally, the step of transforming may comprise applying a directional decomposition transform to the first residual signal to create directional components that correspond to the first residual signal. The filter may thus compensate for effects created by the directional decomposition transform, particularly at the edges of the blocks. N may be 4 and a transform kernel for the transforming may be a 4×4 kernel.

The mask may be a weighted mask and each coefficient of the mask may be a weight between 0 and 1. Thus the coefficients may be variable so as to adaptively adjust the border effects of the residuals.

Preferably the mask comprises a set of coefficients surrounding edges of the mask. More preferably the mask comprises a first coefficient for sides of the mask and a second coefficient for corners of the mask. Thus, the coefficients may be separately defined for the sides and corners so as to differentially adjust the residuals and compensate for the block effects differentially while reducing complexity.

In specific embodiments, N may be 4 and the mask may be:

| α | β | β | α |
|---|---|---|---|
| β | 1 | 1 | β |
| β | 1 | 1 | β |
| α | β | β | α | wherein α and β and variable coefficients and where $0 \leq \alpha \leq 1$ and $0 \leq \beta \leq 1$. In this way the centre of the block is unaffected but effects of the residuals at the borders of the blocks are reduced.

Filtering the first decoded residual signal may comprise applying an in-loop filter.

The method may further comprise: signalling coefficients of the mask in configuration metadata accompanying the first or second residual signal or both. The encoder may thus be able to signal to the decoder the coefficients used so that any coefficients applied during the encoding process can be applied similarly at the decoding side.

An encoder configured to carry out the method of any of the above aspects or implementations may also be provided.

According to a further aspect of the invention there is provided a method of decoding an input signal from a plurality of encoded signals, the method comprising: receiving a base encoded signal and instructing a decoding of the base encoded signal to produce a base decoded signal; receiving a first encoded residual signal and decoding the first encoded residual signal to produce a first decoded residual signal; filtering the first decoded residual signal to produce a filtered version of the first decoded residual signal; correcting the base decoded signal using the filtered version of the first decoded residual signal to produce a corrected version of the base decoded signal; upsampling the corrected version of the base decoded signal to produce an upsampled signal; receiving a second encoded residual signal and decoding the second encoded residual signal to produce a second decoded residual signal; and combining the upsampled signal with the second decoded residual signal to produce a reconstructed version of the input signal. Picture quality can thus be improved by applying a filter on the level 1 pathway of the architecture. Thus, the mask is applied on the first residual signal which is subsequently used to produce the output from the second residual signal so that effects introduced during the process of decoding the residual signal are not exacerbated.

Preferably, the step of decoding the first encoded residual signal may comprise applying an inverse quantization operation to the first encoded residual signal. More preferably, the step of decoding the first encoded residual signal comprises applying an inverse transformation, the inverse transformation being applied on a block-by-block basis, and wherein filtering the first decoded residual signal comprises applying an N×N mask to each block of the inverse transformed signal, wherein N×N is a size of a transform kernel used in the inverse transformation. Thus, the mask may be able to compensate for effects introduced during the quantization or transformation processes.

The step of inverse transforming may comprise applying an inverse directional decomposition transform to directional components of the first encoded residual signal to obtain residual values that correspond to the first residual signal. N may be 4 and the transform kernel may be a 4×4 kernel. The mask may be a weighted mask and each coefficient of the mask may be a weight between 0 and 1. The mask may comprise a set of coefficients surrounding edges of the mask. The mask may comprise a first coefficient for sides of the mask and a second coefficient for corners of the mask. The mask may be:

| α | β | β | α |
|---|---|---|---|
| β | 1 | 1 | β |
| β | 1 | 1 | β |
| α | β | β | α | wherein α and β and variable coefficients and where $0 \leq \alpha \leq 1$ and $0 \leq \beta \leq 1$.

The method may further comprise: retrieving coefficients of the mask from configuration metadata. In this way, appropriate coefficients may be set according to the effects that are desired to be compensated for and may be variable.

The method may further comprise retrieving the coefficients from a stream header. Thus, the coefficients can be effectively exchanged between the encoder and decoder and made variable according to the specific use to enable tailored adjustment in an efficient manner.

The method may further comprise identifying a transform applied to the first residual signal and only applying the mask if the transform is a transform of a predetermined size. Thus, the step may be applied only when it will have a suitable effect, thus reducing process complexity.

A decoder configured to carry out the method of any of the above aspects or implementations may also be provided.

According to further aspects of the invention there may be provided computer readable media which when executed by a processor cause the processor to perform any of the methods of the above aspects.

BRIEF DESCRIPTION OF THE DRAWINGS

Embodiments of the invention will now be described with reference to the accompanying drawings, in which.

DETAILED DESCRIPTION

Figure 1:
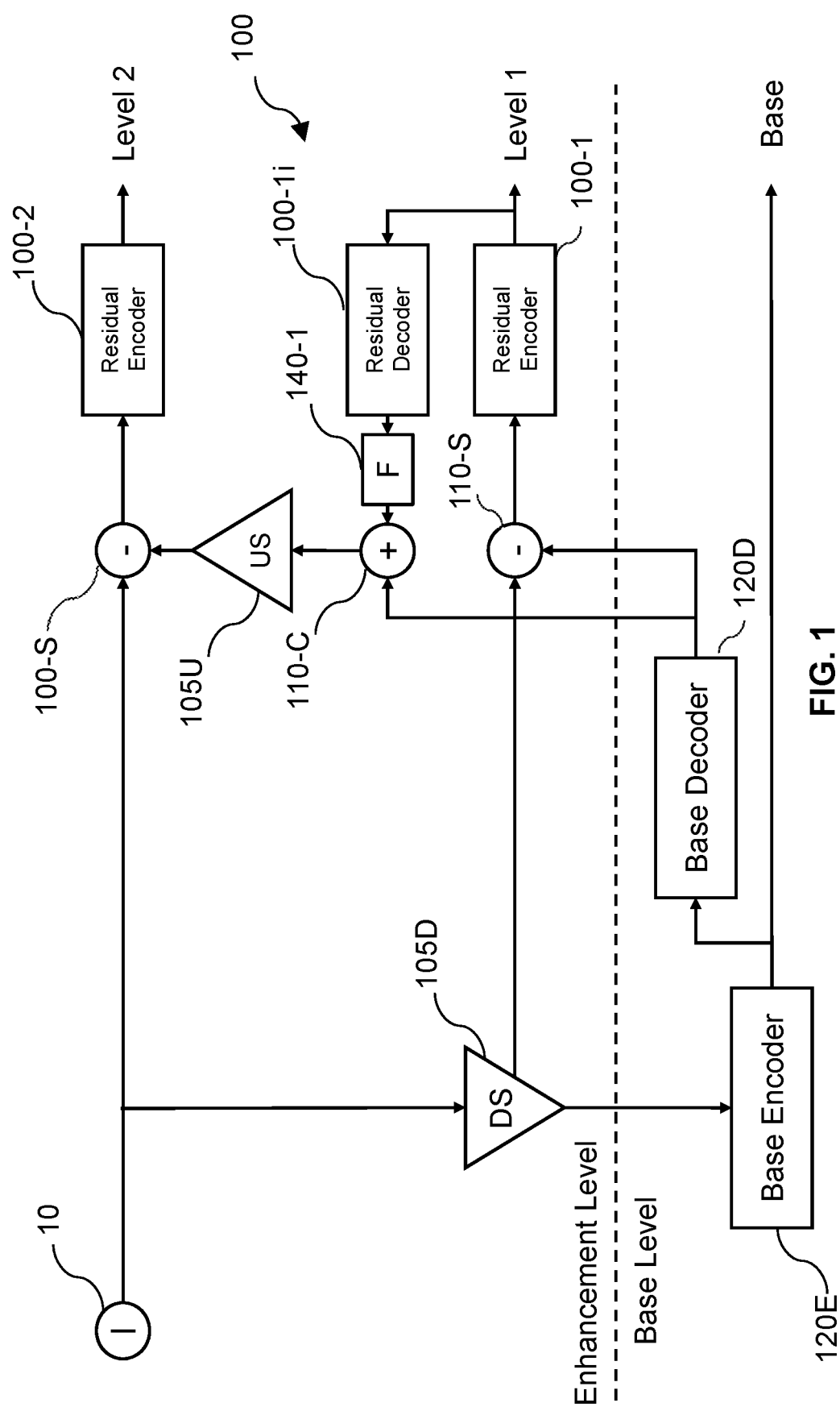
FIG. 1 is a block diagram illustrating an encoding process.

This disclosure describes a hybrid backward-compatible coding technology. This technology is a flexible, adaptable, highly efficient and computationally inexpensive coding format which combines a different video coding format, a base codec (i.e. encoder-decoder), (e.g. AVC/H.264, HEVC/H.265, or any other present or future codec, as well as non-standard algorithms such as VP9, AV1 and others) with at least two enhancement levels of coded data.

The general structure of the encoding scheme uses a downsampled source signal encoded with a base codec, adds a first level of correction or enhancement data to the decoded output of the base codec to generate a corrected picture, and then adds a further level of correction or enhancement data to an upsampled version of the corrected picture.

Thus, the streams are considered to be a base stream and one or more enhancement streams, where there are typically two enhancement streams. It is worth noting that typically the base stream may be decodable by a hardware decoder while the enhancement stream(s) may be suitable for software processing implementation with suitable power consumption.

This structure creates a plurality of degrees of freedom that allow great flexibility and adaptability in many situations, thus making the coding format suitable for many use cases including over-the-top (OTT) transmission, live streaming, live ultra-high-definition (UHD) broadcast, and so on. It also provides for low complexity video coding.

Although the decoded output of the base codec is not intended for viewing, it is a fully decoded video at a lower resolution, making the output compatible with existing decoders and, where considered suitable, also usable as a lower resolution output.

The codec format uses a minimum number of relatively simple coding tools. When combined synergistically, they can provide visual quality improvements when compared with a full resolution picture encoded with the base codec whilst at the same time generating flexibility in the way they can be used.

The methods and apparatuses are based on an overall algorithm which is built over an existing encoding and/or decoding algorithm (e.g. MPEG standards such as AVC/H.264, HEVC/H.265, etc. as well as non-standard algorithms such as VP9, AV1, and others) which works as a baseline for an enhancement layer. The enhancement layer works accordingly to a different encoding and/or decoding algorithm. The idea behind the overall algorithm is to encode/decode hierarchically the video frame as opposed to using block-based approaches as done in the MPEG family of algorithms. Hierarchically encoding a frame includes generating residuals for the full frame, and then a reduced or decimated frame and so on.

In general, the term "residuals" as used herein refers to a difference between a value of a reference array or reference frame and an actual array or frame of data. The array may be a one or two-dimensional array that represents a coding unit. For example, a coding unit may be a 2×2 or 4×4 set of residual values that correspond to similar sized areas of an input video frame. It should be noted that this generalised example is agnostic as to the encoding operations performed and the nature of the input signal. Reference to "residual data" as used herein refers to data derived from a set of residuals, e.g. a set of residuals themselves or an output of a set of data processing operations that are performed on the set of residuals. Throughout the present description, generally a set of residuals includes a plurality of residuals or residual elements, each residual or residual element corresponding to a signal element, that is, an element of the signal or original data. The signal may be an image or video. In these examples, the set of residuals corresponds to an image or frame of the video, with each residual being associated with a pixel of the signal, the pixel being the signal element.

An encoding process is depicted in the block diagram of FIG. 1. The encoding process is split into two halves as shown by the dashed line. Below the dashed line is the base level of an encoder 100, which may usefully be implemented in hardware. Above the dashed line is the enhancement level, which may usefully be implemented in software. The encoder 100 may comprise only the enhancement level processes, or a combination of the base level processes and enhancement level processes as needed. The encoder 100 may usefully be implemented in software, especially at the enhancement level. This arrangement allows, for example, a legacy hardware encoder that provides the base level to be upgraded using a firmware (e.g. software) update, where the firmware is configured to provide the enhancement level. In newer devices, both the base level and the enhancement level may be provided in hardware and/or a combination of hardware and software.

As noted, a base stream may be provided along with two levels (or sub-levels) of enhancement within an enhancement stream. The signal is processed to generate various encoded streams. A base encoded stream is produced by feeding a base codec (e.g., AVC, HEVC, or any other codec) with a downsampled version of the input signal. The encoded base stream may be referred to as the base layer or base level. A first encoded stream (encoded level 1 stream) is produced by processing the residuals obtained by taking the difference between a reconstructed base codec video and the downsampled version of the input video. A second encoded stream (encoded level 2 stream) is produced by processing the residuals obtained by taking the difference between an upsampled version of a corrected version of the reconstructed base coded video and the input video. In certain cases, the components of FIG. 1 may provide a general low complexity encoder. In certain cases, the enhancement streams may be generated by encoding processes that form part of the low complexity encoder and the low complexity encoder may be configured to control an independent base encoder and decoder (e.g. as packaged as a base codec). In other cases, the base encoder and decoder may be supplied as part of the low complexity encoder. In one case, the low complexity encoder of FIG. 1 may be seen as a form of wrapper for the base codec, where the functionality of the base codec may be hidden from an entity implementing the low complexity encoder.

The encoder topology at a general level is as follows. The encoder 100 comprises an input I for receiving an input signal 10. The input I is connected to a down-sampler 105D to produce a downsampled signal to be encoded by a base encoder 120E of a base codec. The down-sampling can be done either in both vertical and horizontal directions, or alternatively only in the horizontal direction. The down-sampler 105D outputs to a base encoder 120E at the base level of the encoder 100. The base encoder 120E outputs the base encoded stream. Thus, a base encoded stream is produced by feeding the base codec 120 (e.g., AVC, HEVC, or any other codec) at the base level with a downsampled version of the input video 10, using the down-sampler 105D.

As mentioned above, the input signal 10, such as in this example a full (or highest) resolution video, is processed by the encoder 100 to generate the various encoded streams.

A first encoded stream (an encoded level 1 stream) is created by reconstructing the encoded base stream to create a base reconstruction, and then taking the difference between the base reconstruction and the downsampled version of the input video 10. A second encoded stream (an encoded level 2 stream) is created by upsampling a corrected version of the base reconstruction, using the upsampler 105U, and taking the difference between the corrected version of the base reconstruction and the input signal 10.

To generate the encoded level 1 stream, the encoded base stream is decoded by a base decoder 120D (i.e. a decoding operation is applied to the encoded base stream to generate a decoded base stream). Decoding may be performed by a decoding function or mode of a base codec. The difference between the decoded base stream and the downsampled input video is then created at a level 1 comparator 110-S (i.e. a subtraction operation is applied to the downsampled input video and the decoded base stream). The difference is then encoded by a first residual encoder 100-1 (i.e. a level 1 encoder) to generate the encoded Level 1 stream (i.e. an encoding operation is applied to the first set of residuals to generate a first enhancement stream).

The base encoder 120E and a base decoder 120D may be implemented by a base codec (e.g. as different functions of a common codec). The base codec, and/or one or more of the base encoder 120E and the base decoder 120D may comprise suitably configured electronic circuitry (e.g. a hardware encoder/decoder) and/or computer program code that is executed by a processor.

As noted above, the enhancement stream may comprise a first level of enhancement and a second level of enhancement. The first level of enhancement may be considered to be a corrected stream, e.g. a stream that provides a level of correction to the base encoded/decoded video signal at a lower resolution than the input video 100. The second level of enhancement may be considered to be a further level of enhancement that converts the corrected stream to the original input video 100, e.g. that applies a level of enhancement or correction to a signal that is reconstructed from the corrected stream.

In the example of FIG. 1, the second level of enhancement is created by encoding a further set of residuals. The further set of residuals are generated by a level 2 comparator 100-S. The level 2 comparator 100-S determines a difference between an upsampled version of a decoded level 1 stream, e.g. the output of an upsampling component 105U, and the input signal 100. The input to the upsampling component 105U is generated by applying a first decoder 100-1*i* (i.e. a level 1 decoder) to the output of the first encoder 100-1. This generates a decoded set of level 1 residuals. These are then combined with the output of the base decoder 120D at summation component 110-C. This effectively applies the level 1 residuals to the output of the base decoder 120D and allows for losses in the level 1 encoding and decoding process to be corrected by the level 2 residuals. The output of summation component 110-C may be seen as a simulated signal that represents an output of applying level 1 processing to the encoded base stream and the encoded level 1 stream at a decoder.

As noted, an upsampled stream is compared to the input signal which creates a further set of residuals (i.e. a difference operation is applied to the upsampled re-created stream to generate a further set of residuals). The further set of residuals are then encoded by a second encoder 100-2 (i.e. a level 2 encoder) as the encoded Level 2 enhancement stream (i.e. an encoding operation is then applied to the further set of residuals to generate an encoded further enhancement stream).

Thus, as illustrated in FIG. 1 and described above, the output of the encoding process is a base stream and one or more enhancement streams which preferably comprise a first level of enhancement and a further level of enhancement. The three streams may be combined, with or without additional information such as control headers, to generate a combined stream for the video encoding framework that represents an input video. It should be noted that the components shown in FIG. 1 may operate on blocks or coding units of data, e.g. corresponding to 2×2 or 4×4 portions of a frame at a particular level of resolution. The components operate without any inter-block dependencies; hence they may be applied in parallel to multiple blocks or coding units within a frame. This differs from comparative video encoding schemes wherein there are dependencies between blocks (e.g. either spatial dependencies or temporal dependencies). The dependencies of comparative video encoding schemes limit the level of parallelism and require a much higher complexity.

In accordance with certain embodiments of the invention, prior to correcting the base reconstruction, a deblocking filter block 140-1 may apply a filter to the corrected version.

The deblocking filter block 140-1 or module may operate on each block of transformed residuals by applying a mask whose weights can be specified. More detail will be provided below. In sum, embodiments of the present invention teach applying filters and/or masks to decoded residuals. Deblocking includes weighting the borders of blocks of transformed residuals to improve picture quality and/or reduce blocking.

Figure 2:
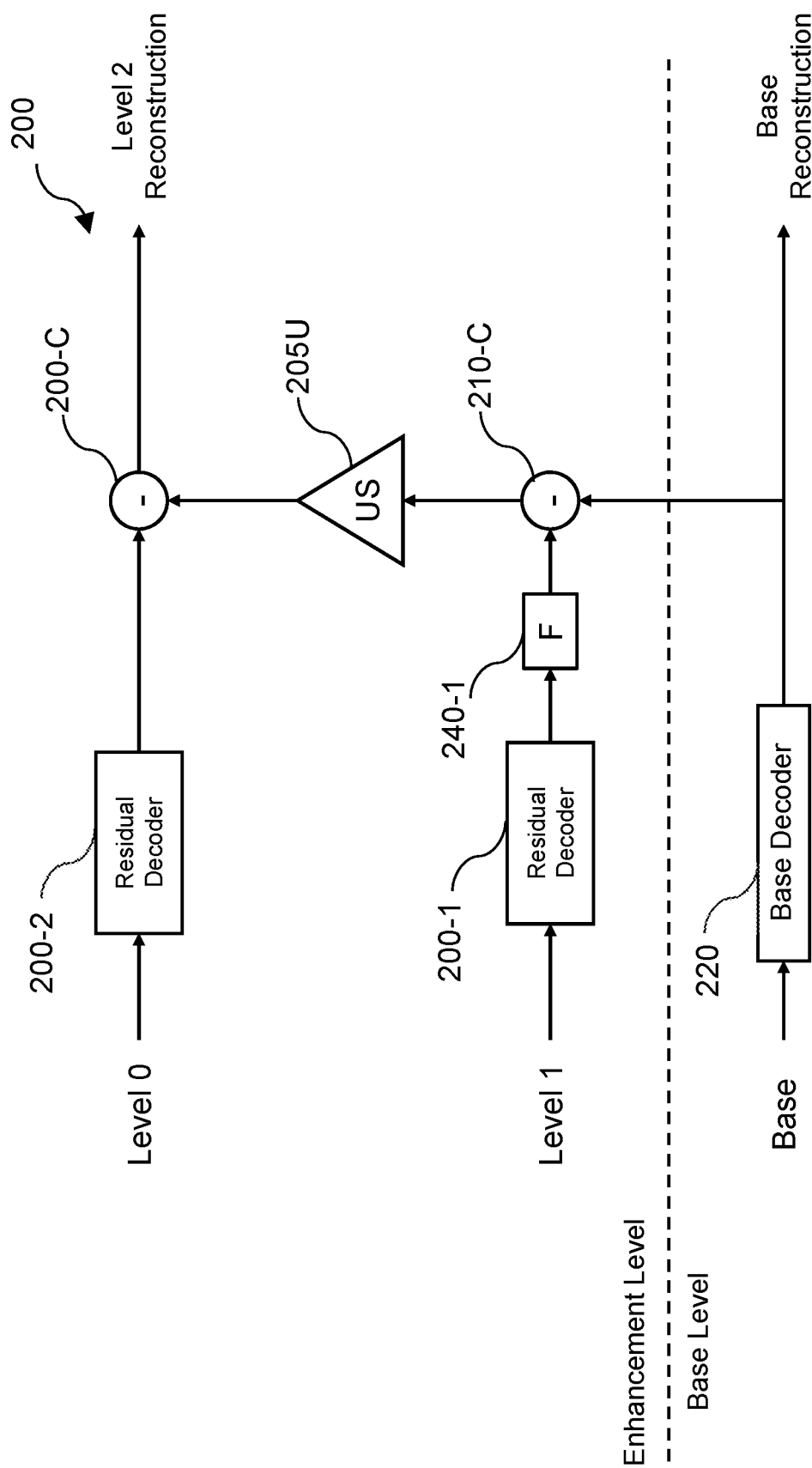
FIG. 2 is a block diagram illustrating a decoding process which corresponds to the encoding process of FIG. 1.

A corresponding decoding process is depicted in the block diagram of FIG. 2. The decoding process is split into two halves as shown by the dashed line. Below the dashed line is the base level of a decoder 200, which may usefully be implemented in hardware. Above the dashed line is the enhancement level, which may usefully be implemented in software. The decoder 200 may comprise only the enhancement level processes, or a combination of the base level processes and enhancement level processes as needed. The decoder 200 may usefully be implemented in software, especially at the enhancement level, and may suitably sit over legacy decoding technology, particularly legacy hardware technology. By legacy technology, it is meant older technology previously developed and sold which is already in the marketplace, and which would be inconvenient and/or expensive to replace, and which may still serve a purpose for decoding signals.

The decoder topology at a general level is as follows. The decoder 200 comprises an input (not shown) for receiving one or more input signals comprising the encoded base stream, the encoded level 1 stream, and the encoded level 2 stream together with optional headers containing further decoding information. The decoder 200 comprises a base decoder 220 at the base level.

The decoder 200 receives the one or more input signals and directs the three streams generated by the encoder 100. The encoded base stream is directed to and decoded by the base decoder 213, which corresponds to the base codec 120 used in the encoder 100, and which acts to reverse the encoding process at the base level.

The encoded level 1 stream is received by a first decoder 200-1 (i.e. a level 1 decoder), which decodes a first set of residuals as encoded by the first encoder 100-1 of FIG. 1. At a first summation component 210-C, the output of the base decoder 220 is combined with the decoded residuals obtained from the first decoder 200-1. The combined video, which may be said to be a level 1 reconstructed video signal, is upsampled by upsampling component 205U. The encoded level 2 stream is received by a second decoder 200-2 (i.e. a level 2 decoder). The second decoder 200-2 decodes a second set of residuals as encoded by the second encoder 100-2 of FIG. 1. The output of the second decoder 200-2 is a second set of decoded residuals. These may be at a higher resolution to the first set of residuals and the input to the upsampling component 205U. At a second summation component 200-C, the second set of residuals from the second decoder 200-2 are combined with the output of the upsampling component 205U, i.e. an upsampled reconstructed level 1 signal, to reconstruct the original signal.

At the decoding side, in accordance with embodiments of the present invention there may be provided a deblocking filter module 240-1. In a similar manner to the encoding side, the deblocking filter module 240-1 may be arranged prior to the upsampling module 205U and prior to the first summation component 210-C. As noted above, the deblocking filter block 240-1 or module may operate on each block of transformed residuals by applying a mask whose weights can be specified. More detail will be provided below.

As per the low complexity encoder, the low complexity decoder of FIG. 2 may operate in parallel on different blocks or coding units of a given frame of the video signal. Additionally, decoding by two or more of the base decoder 210, the first decoder 211 and the second decoder 214 may be performed in parallel (e.g. different areas of the output video may be reconstructed in parallel). This is possible as there are no inter-block dependencies.

In the decoding process, the decoder may parse a set of headers (not shown, which may contain global configuration information, picture or frame configuration information, and data block configuration information) and configure the low complexity decoder based on those headers. Where the input signal is a video signal, in order to re-create the input video, the low complexity decoder may decode each of the base stream, the first enhancement stream and the further or second enhancement stream. The frames of the stream may be synchronised and then combined to derive a decoded video. The decoded video may be a lossy or lossless reconstruction of the original input video depending on the configuration of the low complexity encoder and decoder. In many cases, the decoded video may be a lossy reconstruction of the original input video where the losses have a reduced or minimal effect on the perception of the decoded video.

In each of FIGS. 1 and 2, the level 2 and level 1 encoding operations may include the steps of transformation, quantization and entropy encoding (e.g. in that order). Similarly, at the decoding stage, the residuals may be passed through an entropy decoder, a de-quantizer and an inverse transform module (e.g. in that order). Any suitable encoding and corresponding decoding operation may be used. Preferably however, the level 2 and level 1 encoding steps may be performed in software (e.g. as executed by one or more central or graphical processing units in an encoding device).

The transform as described herein may use a directional decomposition transform such as a Hadamard-based transform. Both may comprise a small kernel or matrix that is applied to flattened coding units of residuals (i.e. 2×2 or 4×4 blocks of residuals). More details on the transform can be found for example in patent applications PCT/EP2013/059847 or PCT/GB2017/052632, which are incorporated herein by reference. The encoder may select between different transforms to be used, for example between a size of kernel to be applied.

The transform may transform the residual information to four surfaces. For example, the transform may produce the following components: average, vertical, horizontal and diagonal.

Any known quantization scheme may be useful to create the residual signals into quanta, so that certain variables can assume only certain discrete magnitudes. In one case quantizing comprises actioning a division by a pre-determined step-width. This may be applied at both levels (0 and 1). For example, quantizing may comprise dividing transformed residual values by a step-width. The step-width may be pre-determined, e.g. selected based on a desired level of quantization. In one case, division by a step-width may be converted to a multiplication by an inverse step-width, which may be more efficiently implemented in hardware. In this case de-quantizing may comprise multiplying by the step-width.

The video compression residual data for the full-sized video frame may be referred to as LoQ-2 (e.g. 1920×1080 for an HD video frame), while that of the decimated frame may be referred to as LoQ-x, where x denotes a number corresponding to a hierarchical decimation. In the described examples of FIGS. 1 and 2, the variable x may have values of 1 and 2 represent the first and second enhancement streams. Hence there are 2 hierarchical levels for which compression residuals will be generated. Other naming schemes for the levels may also be applied without any change in functionality (e.g. the level 1 and level 2 enhancement streams described herein may alternatively be referred to as level 1 and level 2 streams—representing a count down from the highest resolution).

Figure 3:
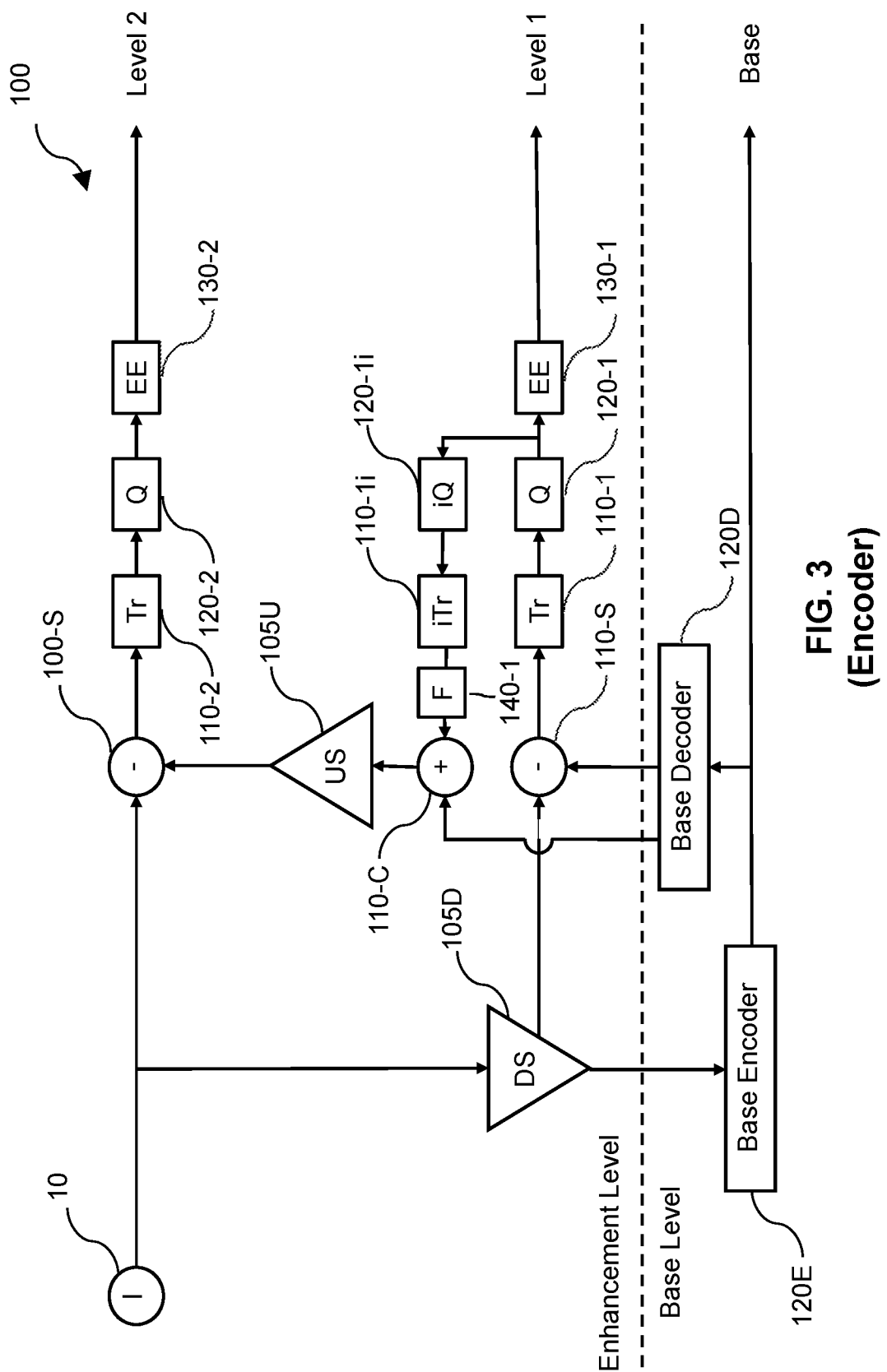
FIG. 3 is a block diagram illustrating the encoding process of FIG. 1 in more detail.

FIG. 3 shows the encoder 100 of FIG. 1 in more detail. The encoded base stream is created directly by the base encoder 120E, and may be quantized and entropy encoded as necessary. In certain cases, these latter processes may be performed as part of the encoding by the base encoder 120E. To generate the encoded level 1 stream, the encoded base stream is decoded at the encoder 100 (i.e. a decoding operation is applied at base decoding block 120D to the encoded base stream). The base decoding block 120D is shown as part of the base level of the encoder 100 and is shown separate from the corresponding base encoding block 120E. For example, the base decoder 120D may be a decoding component that complements an encoding component in the form of the base encoder 120E with a base codec. In other examples, the base decoding block 120D may instead be part of the enhancement level and in particular may be part of processing block 100-1.

Returning to FIG. 3, a difference between the decoded base stream output from the base decoding block 120D and the downsampled input video is created (i.e. a subtraction operation 110-S is applied to the downsampled input video and the decoded base stream to generate a first set of residuals). Here the term "residuals" is used in the same manner as that known in the art; that is, residuals represent the error or differences between a reference signal or frame and a desired signal or frame. Here the reference signal or frame is the decoded base stream and the desired signal or frame is the downsampled input video. Thus the residuals used in the first enhancement level can be considered as a correction signal as they are able to 'correct' a future decoded base stream to be the or a closer approximation of the downsampled input video that was used in the base encoding operation. This is useful as this can correct for quirks or other peculiarities of the base codec. These include, amongst others, motion compensation algorithms applied by the base codec, quantization and entropy encoding applied by the base codec, and block adjustments applied by the base codec.

The first set of residuals are processed at block 100-1 in FIG. 1. The components of this block are shown in more detail in FIG. 3. In particular, the first set of residuals are transformed, quantized and entropy encoded to produce the encoded level 1 stream. In FIG. 3, a transform operation 110-1 is applied to the first set of residuals; a quantization operation 120-1 is applied to the transformed set of residuals to generate a set of quantized residuals; and, an entropy encoding operation 130-1 is applied to the quantized set of residuals to generate the encoded level 1 stream at the first level of enhancement. However, it should be noted that in other examples only the quantization step 120-1 may be performed, or only the transform step 110-1. Entropy encoding may not be used, or may optionally be used in addition to one or both of the transform step 110-1 and quantization step 120-1. The entropy encoding operation can be any suitable type of entropy encoding, such as a Huffmann encoding operation or a run-length encoding (RLE) operation, or a combination of both a Huffmann encoding operation and a RLE operation.

As noted above, the enhancement stream may comprise the encoded level 1 stream (the first level of enhancement) and the encoded level 2 stream (the second level of enhancement). The first level of enhancement may be considered to enable a corrected video at a base level, that is, for example to correct for encoder quirks. The second level of enhancement may be considered to be a further level of enhancement that is usable to convert the corrected video to the original input video or a close approximation thereto. For example, the second level of enhancement may add fine detail that is lost during the downsampling and/or help correct from errors that are introduced by one or more of the transform operation 110-1 and the quantization operation 120-1.

Referring to both FIG. 1 and FIG. 3, to generate the encoded level 2 stream, a further level of enhancement information is created by producing and encoding a further set of residuals at block 100-2. The further set of residuals are the difference between an upsampled version (via upsampler 105U) of a corrected version of the decoded base stream (the reference signal or frame), and the input signal 10 (the desired signal or frame).

To achieve a reconstruction of the corrected version of the decoded base stream as would be generated at the decoder 200, at least some of the processing steps of block 100-1 are reversed to mimic the processes of the decoder 200, and to account for at least some losses and quirks of the transform and quantization processes. To this end, block 100-1 comprises an inverse quantize block 120-1*i* and an inverse transform block 110-1*i*. The quantized first set of residuals are inversely quantized at inverse quantize block 120-1*i* and are inversely transformed at inverse transform block 110-1*i* in the encoder 100 to regenerate a decoder-side version of the first set of residuals.

FIG. 3 illustrates a deblocking filter block 140-1 which may be provided in accordance with certain embodiments of the invention. The deblocking filter step is optional depending on the transform applied and comprises applying a weighted mask to each block of the detransformed first set of residuals. That is, the inversely transformed residuals represent a set of blocks with the set of blocks being of a size dependent on the transform used. Preferably a similarly sized mask is applied each block. In sum, following the inverse transform, the output residuals are filtered (or masked) by a deblocking filter module to further improve the regenerated decoder-side version of the first set of residuals prior to summing operation 110-C. By optional, it may be the case that the transform is such that deblocking filter will not provide sufficient improvement. For example, deblocking may be provided for 4×4 transform blocks but not 2×2.

The decoded base stream from decoder 120D is combined with this improved decoder-side version of the first set of residuals (i.e. a summing operation 110-C is performed on the decoded base stream and the decoder-side version of the first set of residuals). Summing operation 110-C generates a reconstruction of the downsampled version of the input video as would be generated in all likelihood at the decoder—i.e. a reconstructed base codec video). As illustrated in FIG. 1 and FIG. 3, the reconstructed base codec video is then upsampled by upsampler 105U.

The upsampled signal (i.e. reference signal or frame) is then compared to the input signal 10 (i.e. desired signal or frame) to create a further set of residuals (i.e. a difference operation 100-S is applied to the upsampled re-created stream to generate a further set of residuals). The further set of residuals are then processed at block 100-2 to become the encoded level 2 stream (i.e. an encoding operation is then applied to the further set of residuals to generate the encoded further enhancement stream).

In particular, the further set of residuals are transformed (i.e. a transform operation 110-2 is performed on the further set of residuals to generate a further transformed set of residuals). The transformed residuals are then quantized and entropy encoded in the manner described above in relation to the first set of residuals (i.e. a quantization operation 120-2 is applied to the transformed set of residuals to generate a further set of quantized residuals; and, an entropy encoding operation 120-2 is applied to the quantized further set of residuals to generate the encoded level 2 stream containing the further level of enhancement information). However, only the quantization step 120-1 may be performed, or only the transform and quantization step. Entropy encoding may optionally be used in addition. Preferably, the entropy encoding operation may be a Huffmann encoding operation or a run-length encoding (RLE) operation, or both.

Thus, as illustrated in FIGS. 1 and 3 and described above, the output of the encoding process is a base stream at a base level, and one or more enhancement streams at an enhancement level which preferably comprises a first level of enhancement and a further level of enhancement.

As can be seen in FIG. 3, a base codec can be separated into 2 components, that is a base encoder 120E and a base decoder 120D. It should be noted that the encoding and decoding parts can be in a single codec module, either in hardware or in software, or they can be separate modules or components. The base decoder 120D may reside at the enhancement level in the encoder 100 if required.

Figure 4:
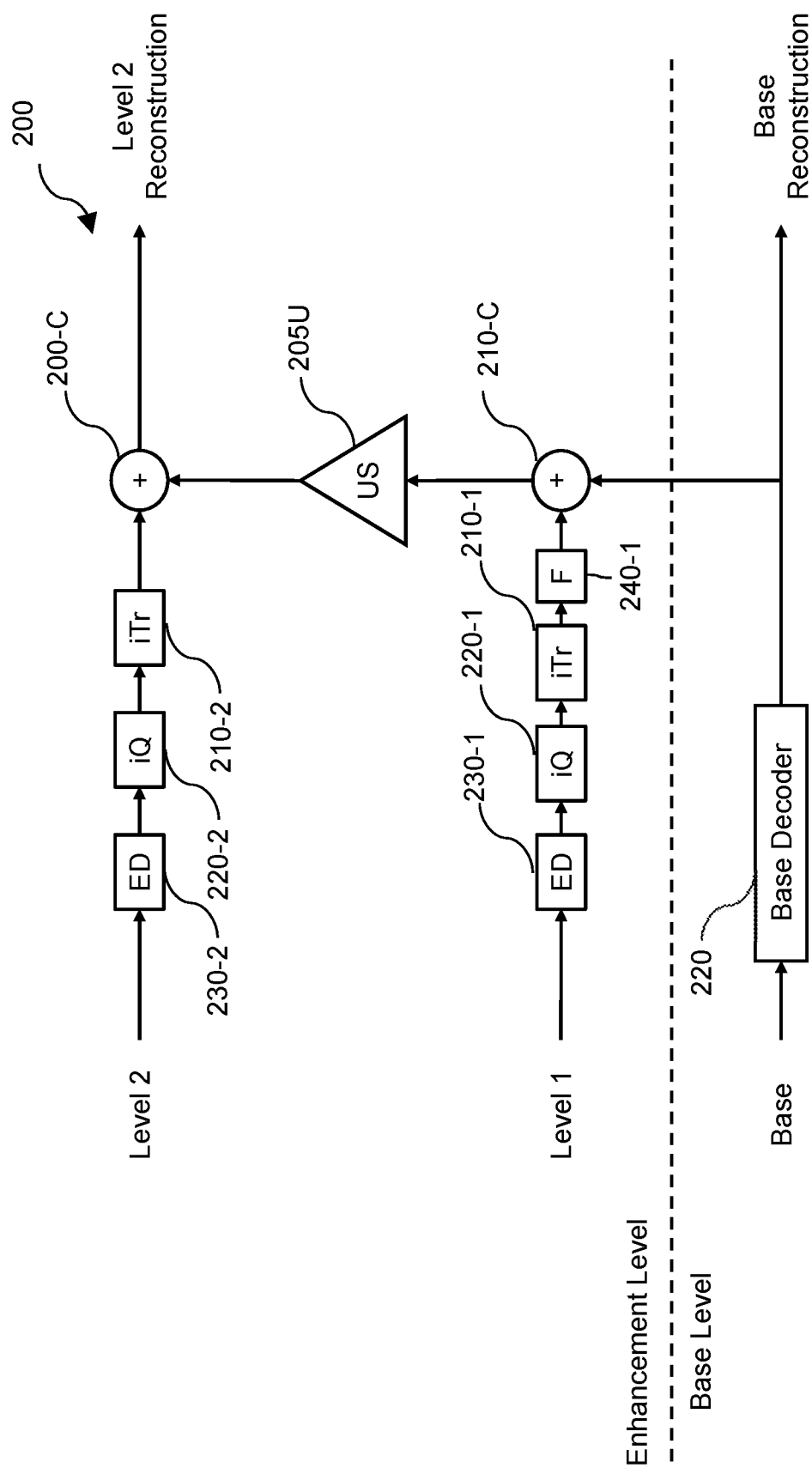
FIG. 4 is a block diagram illustrating the decoding process of FIG. 2 in more detail.

The encoded base stream and one or more enhancement streams are received at the decoder 200. FIG. 4 shows the decoder of FIG. 2 in more detail.

The encoded base stream is decoded at base decoder 220 in order to produce a base reconstruction of the input signal 10 received at encoder 100. This base reconstruction may be used in practice to provide a viewable rendition of the signal 10 at the lower quality level. However, the primary purpose of this base reconstruction signal is to provide a base for a higher quality rendition of the input signal 10. To this end, the decoded base stream is provided to processing block 200-1. Processing block 200-1 also receives encoded level 1 stream and reverses any encoding, quantization and transforming that has been applied by the encoder 100. Block 200-1 comprises an entropy decoding process 230-1, an inverse quantization process 220-1, and an inverse transform process 210-1. Optionally, only one or more of these steps may be performed depending on the operations carried out at corresponding block 100-1 at the encoder. By performing these corresponding steps, a decoded level 1 stream comprising the first set of residuals is made available at the decoder 200. The first set of residuals is combined with the decoded base stream from base decoder 220 (i.e. a summing operation 210-C is performed on a decoded base stream and the decoded first set of residuals to generate a reconstruction of the downsampled version of the input video—i.e. the reconstructed base codec video). As illustrated in FIG. 2 and FIG. 4, the reconstructed base codec video is then upsampled by upsampler 205U.

Prior to the upsampler 205U and in this embodiment prior to the summing operation 210-C, a deblocking filter block 240-1 applies a mask to the inversely transformed residuals to compensate for effects or artefacts which may arise as part of the quantization and transformation processes. The deblocking filter step is optional depending on the transform applied and comprises applying a weighted mask to each block of the inverse transformed first set of residuals. That is, the inversely transformed residuals represent a set of blocks with the set of blocks being of a size dependent on the transform used. Preferably a similarly sized mask is applied each block. In sum, following the inverse transform, the output residuals are filtered (or masked) by a deblocking filter module to further improve the regenerated decoder-side version of the first set of residuals prior to summing operation 210-C.

Whether or not the deblocking filter should be applied may be signalled by the encoder to the decoder. For example, a deblocking_signalled parameter may be included in a stream header and specifies whether the deblocking filter should be applied. This flag indicates to the decoder that it should use the deblocking filter. Optionally, this flag indicates that a deblocking filter was used in the Level 1 return pathway, as indicated in the context of FIG. 3 for example. In examples, the flag may be set in configuration data for a payload such as included in a header corresponding to that particular payload.

Signalling examples include: deblocking_signalled which specifies whether deblocking filter should be applied; deblocking_first_coefficient which specifies the value of the first coefficient in the deblocking mask namely 4×4 block corner residual weight; and, deblocking_second_coefficient specifies the value of the second coefficient in the deblocking mask namely 4×4 block side residual weight.

In certain embodiments the deblocking filter may be referred to as an in-loop filter. Conceptually, the filter is referred to as an in-loop filter since the processing influences the reference data, so that manipulated reference data could propagate the effect for upcoming picture coding. The deblocking filter operates on transform block edges in order to reduce the amount of visible block structures, which result from the block-based nature of the coding scheme.

As noted elsewhere in this document, the transform type may be variable. In certain embodiments the transform may be a 2×2 or 4×4 transform using a correspondingly sized kernel. At the decoder, the operation may identify the type of transform used and accordingly identify that deblocking is not necessary or not appropriate and may not be performed. For example, a 2×2 transform may not create or suffer from the same block edges as a 4×4 transform and may not be necessary.

The deblocking filter may involve applying a mask with a set of weights to each block of transformed residuals. The weights may be arranged around the border or edges of the mark. The weights may be predetermined or may be variable. In preferred examples, the weights may be signalled by the encoder to the decoder, preferably in configuration metadata for example in a stream header.

In a specific example, the mask may comprise two different coefficients. A first coefficient may be positioned to be applied at the sides of the mask and a second coefficient may be positioned to be applied at the corners of the mask. In a particular specific example, where the filter operates on each of a set of 4×4 blocks of transformed residuals by applying a mask, the weights may be signalled as follows:

| α | β | β | α |
| β | 1 | 1 | β |
| β | 1 | 1 | β |
| α | β | β | α | where $0 \leq \alpha \leq 1$ and $0 \leq \beta \leq 1$ and where a is a deblocking_first_coefficient and specifies the value of the first coefficient in the deblocking mask namely 4×4 block corner residual weight and where β is a deblocking_second_coefficient and specifies the value of the second coefficient in the deblocking mask namely 4×4 block side residual weight.

Thus, in sum, one in-loop filter, namely L−1 residual filter, is applied on a L−1 residual surface block before they are being added to the base reconstructed picture. In a specific decoding process implementation, inputs to this process are: a sample location (xTb0, yTb0) specifying the top-left sample of the current transform block relative to the top left sample of the current picture; and, an array resL1Residuals of a size 4×4 specifying level-1 residuals. Output to this specific decoding process implementation is a 4×4 array of the residual resL1FilteredResiduals with elements resL1FilteredResiduals[x][y]. In-loop filter L−1 residual filter is applied in this specific decoding process implementation as specified by the following ordered steps:

1. A variable deblockEnabled, α and β are derived as follows:
   deblockEnabled=deblocking_signalled
   if (deblockEnabled)
      α=deblocking_first_coefficient
      β=deblocking_second_coefficient
   else
      α=1
      β=1
2. if deblockEnabled is true the following steps are applied:
   resL1FilteredResiduals[0][0]=(resL1Residuals[0][0]*α)>>16
   resL1FilteredResiduals[0][3]=(resL1Residuals[0][3]*α)>>16
   resL1FilteredResiduals[3][0]=(resL1Residuals[3][0]*α)>>16
   resL1FilteredResiduals[3][3]=(resL1Residuals[3][3]*α)>>16
   resL1FilteredResiduals[0][1]=(resL1Residuals[0][1]*β)>>16
   resL1FilteredResiduals[0][2]=(resL1Residuals[0][2]*β)>>16
   resL1FilteredResiduals[1][0]=(resL1Residuals[1][0]*β)>>16
   resL1FilteredResiduals[2][0]=(resL1Residuals[2][0]*β)>>16
   resL1FilteredResiduals[1][3]=(resL1Residuals[1][3]*β)>>16
   resL1FilteredResiduals[2][3]=(resL1Residuals[2][3]*β)>>16
   resL1FilteredResiduals[3][1]=(resL1Residuals[3][1]*β)>>16
   resL1FilteredResiduals[3][2]=(resL1Residuals[3][2]*β)>>16
   resL1FilteredResiduals[1][1]=resL1Residuals[1][1]
   resL1FilteredResiduals[1][2]=resL1Residuals[1][2]
   resL1FilteredResiduals[2][1]=resL1Residuals[2][1]
   resL1FilteredResiduals[2][2]=resL1Residuals[2][2]
   otherwise:
   the filtered residuals are set at the decoded residuals (e.g. resL1FilteredResiduals[i][j]=resL1Residuals[i][j]).

Additionally, and optionally in parallel, the encoded level 2 stream is processed at block 200-2 of FIG. 2 in order to produce a decoded further set of residuals. Similarly to processing block 100-2, processing block 200-2 comprises an entropy decoding process 230-2, an inverse quantization process 220-2 and an inverse transform process 210-2. Of course, these operations will correspond to those performed at block 100-2 in encoder 100, and one or more of these steps may be omitted as necessary. Block 200-2 produces a decoded level 2 stream comprising the further set of residuals and these are summed at operation 200-C with the output from the upsampler 205U in order to create a level 2 reconstruction of the input signal 10.

Thus, as illustrated in FIGS. 1 to 4 and described above, the output of the decoding process is a base reconstruction, and an original signal reconstruction at a higher level. This embodiment is particularly well-suited to creating encoded and decoded video at different frame resolutions. For example, the input signal 10 may be an HD video signal comprising frames at 1920×1080 resolution. In certain cases, the base reconstruction and the level 2 reconstruction may both be used by a display device. For example, in cases of network traffic, the level 2 stream may be disrupted more than the level 1 and base streams (as it may contain up to 4× the amount of data where downsampling reduces the dimensionality in each direction by 2). In this case, when traffic occurs the display device may revert to displaying the base reconstruction while the level 2 stream is disrupted (e.g. while a level 2 reconstruction is unavailable), and then return to displaying the level 2 reconstruction when network conditions improve.

A similar approach may be applied when a decoding device suffers from resource constraints, e.g. a set-top box performing a systems update may have an operation base decoder 220 to output the base reconstruction but may not have processing capacity to compute the level 2 reconstruction.

The encoding arrangement of FIGS. 1 and 3 also enables video distributors to distribute video to a set of heterogeneous devices; those with just a base decoder 220 view the base reconstruction, whereas those with the enhancement level may view a higher-quality level 2 reconstruction. In comparative cases, two full video streams at separate resolutions were required to service both sets of devices. As the level 2 and level 1 enhancement streams encode residual data, the level 2 and level 1 enhancement streams may be more efficiently encoded, e.g. distributions of residual data typically have much of their mass around 0 (i.e. where there is no difference) and typically take on a small range of values about 0. This may be particularly the case following quantization. In contrast, full video streams at different resolutions will have different distributions with a non-zero mean or median that require a higher bit rate for transmission to the decoder.

In sum, the quantized (or controlled) set of residuals are inversely quantized and inversely transformed before a de-blocking filter is applied to generate a decoded first set of residuals (i.e. an inverse quantization operation is applied to the quantized first set of residuals to generate a de-quantized first set of residuals; an inverse transform operation is applied to the de-quantized first set of residuals to generate a de-transformed first set of residuals; and, a de-blocking filter operation is applied to the de-transformed first set of residuals to generate a decoded first set of residuals). The de-blocking filter step is optional depending on the transform applied and comprises applying a weighted mask to each block of the detransformed first set of residuals.

Figure 5:
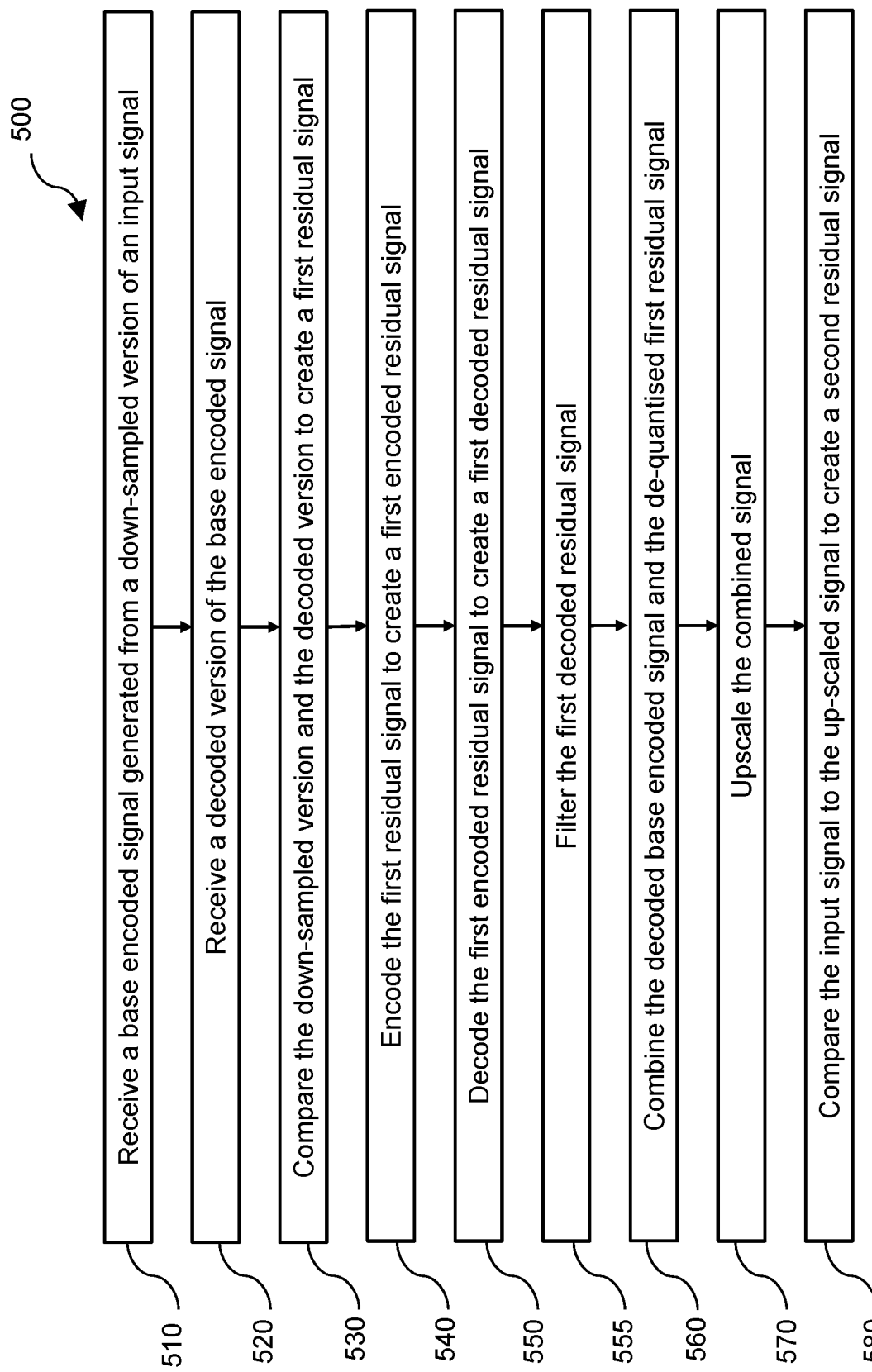
FIG. 5 is a flow chart illustrating an encoding method.
Figure 6:
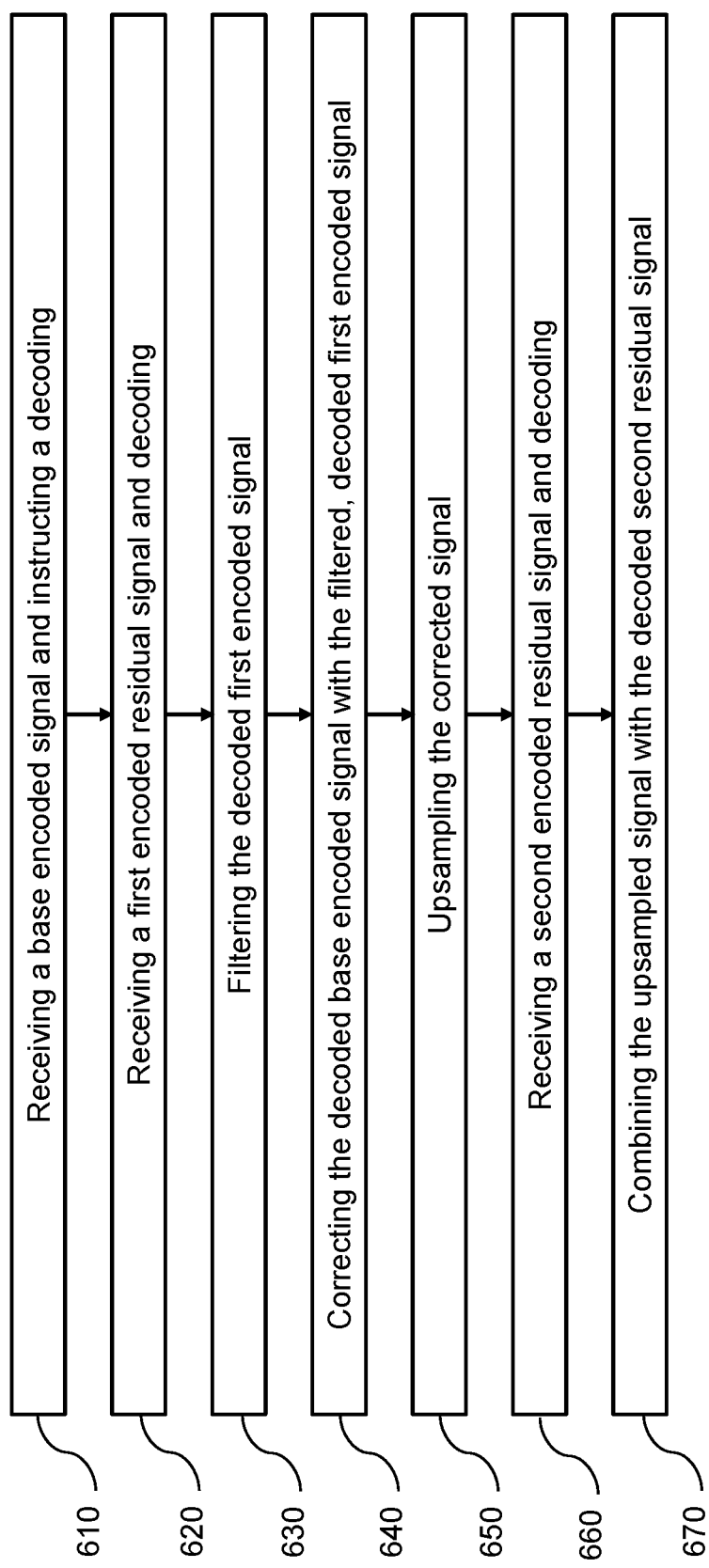
FIG. 6 is a flow chart illustrating an encoding method.

FIG. 5 is a flow chart illustrating a basic encoding method. The method is as follows and is described in the context of the process blocks of FIG. 1:
Step 510: receive a base encoded signal (output of base encoder 120E) generated from a downsampled version (output of downsampler 105D) of an input signal (input signal 10).
Step 520: receive a decoded version (output of base decoder 120D) of the base encoded signal.
Step 530: compare the downsampled version and the decoded version to create a first residual signal (output of comparator 110-S).
Step 540: encode the first residual signal to create a first encoded residual signal (output of residual encoder 100-1).
Step 550: decode the first encoded residual signal to create a first decoded residual signal (output of residual decoder 100-1i).
Step 555: filter the first decoded residual signal (output of Filter 140-1).
Step 560: combine the decoded base encoded signal and the de-quantised first residual signal (output of summation block 110-C).
Step 570: upscale the combined signal (output of upsampler 105U).
Step 580: compare the input signal to the up-scaled signal to create a second residual signal (output of comparator 100-S).

Of course, the method may comprise features compatible with the description of FIGS. 1 to 4. In particular, the method may comprise also transforming and inverse transforming the first residual signal.

In the examples described herein, residuals may be considered to be errors or differences at a particular level of quality or resolution. In described examples, there are two levels of quality or resolutions and thus two sets of residuals (level 1 and level 2). Each set of residuals described herein models a different form of error or difference. The level 1 residuals, for example, typically correct for the characteristics of the base encoder, e.g. correct artefacts that are introduced by the base encoder as part of the encoding process. In contrast, the level 2 residuals, for example, typically correct complex effects introduced by the shifting in the levels of quality and differences introduced by the level 1 correction (e.g. artefacts generated over a wider spatial scale, such as areas of 4 or 16 pixels, by the level 1 encoding pipeline). This means it is not obvious that operations performed on one set of residuals will necessarily provide the same effect for another set of residuals, e.g. each set of residuals may have different statistical patterns and sets of correlations.

In the examples described herein residuals are encoded by an encoding pipeline. This may include transformation, quantisation and entropy encoding operations. It may also include residual ranking, weighting and filtering, and temporal processing. These pipelines are shown in FIGS. 1 and 3A and 3B. Residuals are then transmitted to a decoder, e.g. as first and second enhancement streams, which may be combined with a base stream as a hybrid stream (or transmitted separately). In one case, a bit rate is set for a hybrid data stream that comprises the base stream and both enhancements streams, and then different adaptive bit rates are applied to the individual streams based on the data being processed to meet the set bit rate (e.g. high-quality video that is perceived with low levels of artefacts may be constructed by adaptively assigning a bit rate to different individual streams, even at a frame by frame level, such that constrained data may be used by the most perceptually influential individual streams, which may change as the image data changes).

The sets of residuals as described herein may be seen as sparse data, e.g. in many cases there is no difference for a given pixel or area and the resultant residual value is zero. When looking at the distribution of residuals much of the probability mass is allocated to small residual values located near zero—e.g. for certain videos values of −2, −1, 0, 1, 2 etc. occur the most frequently. In certain cases, the distribution of residual values is symmetric or near symmetric about 0. In certain test video cases, the distribution of residual values was found to take a shape similar to logarithmic or exponential distributions (e.g. symmetrically or near symmetrically) about 0. The exact distribution of residual values may depend on the content of the input video stream.

Residuals may be treated as a two-dimensional image in themselves, e.g. a delta image of differences. Seen in this manner the sparsity of the data may be seen to relate features like "dots", small "lines", "edges", "corners", etc. that are visible in the residual images. It has been found that these features are typically not fully correlated (e.g. in space and/or in time). They have characteristics that differ from the characteristics of the image data they are derived from (e.g. pixel characteristics of the original video signal).

As the characteristics of residuals differ from the characteristics of the image data they are derived from it is generally not possible to apply standard encoding approaches, e.g. such as those found in traditional Moving Picture Experts Group (MPEG) encoding and decoding standards. For example, many comparative schemes use large transforms (e.g. transforms of large areas of pixels in a normal video frame). Due to the characteristics of residuals, e.g. as described above, it would be very inefficient to use these comparative large transforms on residual images. For example, it would be very hard to encode a small dot in a residual image using a large block designed for an area of a normal image.

Certain examples described herein address these issues by instead using small and simple transform kernels (e.g. 2×2 or 4×4 kernels—the Directional Decomposition and the Directional Decomposition Squared—as presented herein). This moves in a different direction from comparative video encoding approaches. Applying these new approaches to blocks of residuals generates compression efficiency. For example, certain transforms generate uncorrelated coefficients (e.g. in space) that may be efficiently compressed. While correlations between coefficients may be exploited, e.g. for lines in residual images, these can lead to encoding complexity, which is difficult to implement on legacy and low-resource devices, and often generates other complex artefacts that need to be corrected.

Certain examples described herein also consider the temporal characteristics of residuals, e.g. as well as spatial characteristics. For example, in residual images details like "edges" and "dots" that may be observed in residual "images" show little temporal correlation. This is because "edges" in residual images often don't translate or rotate like edges as perceived in a normal video stream. For example, within residual images, "edges" may actually change shape over time, e.g. a head turning may be captured within multiple residual image "edges" but may not move in a standard manner (as the "edge" reflects complex differences that depend on factors such as lighting, scale factors, encoding factors etc.). These temporal aspects of residual images, e.g. residual "video" comprising sequential residual "frames" or "pictures" typically differ from the temporal aspects of conventional images, e.g. normal video frames (e.g. in the Y, U or V planes). Hence, it is not obvious how to apply conventional encoding approaches to residual images; indeed, it has been found that motion compensation approaches from comparative video encoding schemes and standards cannot encode residual data (e.g. in a useful manner).

Furthermore, many comparative video encoding approaches attempt to provide temporal prediction and motion-compensation as default to conventional video data. These "built-in" approaches may not only fail when applied to sequential residual images, they may take up unnecessary processing resources (e.g. these resources may be used while actually corrupting the video encoding). It may also generate unnecessary bits that take up an assigned bit rate. It is not obvious from conventional approaches how to address these problems.

FIG. 7 is a flow chart illustrating a basic decoding method. The method is as follows and is described in the context of the process blocks of FIG. 2:

Step 610: receive a base encoded signal and instructing a decoding to produce a base decoded signal (output of base decoder 220).
Step 620: receive a first encoded residual signal and decode (output of base decoder 200-1).
Step 630: filtering the decoded first residual signal (output of Filter 240-1).
Step 640: correct the decoded base encoded signal with the filtered, decoded first encoded residual signal (output of summation block 210-C).
Step 650: upsample the corrected signal (output of upsampler 205U).
Step 660: receive a second encoded residual signal and decode (output of residual decoder 200-2).
Step 670: combine the upsampled signal with the decoded second residual signal (output of summations block 200-C).

Of course, the method may comprise features compatible with the description of FIGS. 1 to 4. In particular, the method may comprise inverse transforming the first encoded residual signal.

At both the encoder and decoder, for example implemented in a streaming server or client device or client device decoding from a data store, methods and processes described herein can be embodied as code (e.g., software code) and/or data. The encoder and decoder may be implemented in hardware or software as is well-known in the art of data compression. For example, hardware acceleration using a specifically programmed Graphical Processing Unit (GPU) or a specifically designed Field Programmable Gate Array (FPGA) may provide certain efficiencies. For completeness, such code and data can be stored on one or more computer-readable media, which may include any device or medium that can store code and/or data for use by a computer system. When a computer system reads and executes the code and/or data stored on a computer-readable medium, the computer system performs the methods and processes embodied as data structures and code stored within the computer-readable storage medium. In certain embodiments, one or more of the steps of the methods and processes described herein can be performed by a processor (e.g., a processor of a computer system or data storage system).

Generally, any of the functionality described in this text or illustrated in the figures can be implemented using software, firmware (e.g., fixed logic circuitry), programmable or non-programmable hardware, or a combination of these implementations. The terms "component" or "function" as used herein generally represents software, firmware, hardware or a combination of these. For instance, in the case of a software implementation, the terms "component" or "function" may refer to program code that performs specified tasks when executed on a processing device or devices. The illustrated separation of components and functions into distinct units may reflect any actual or conceptual physical grouping and allocation of such software and/or hardware and tasks.

The invention claimed is:

1. A method of encoding an input signal, the method comprising:
   producing a base encoded signal by feeding an encoder with a downsampled version of an input signal;
   producing a first residual signal by:
   obtaining a decoded version of the base encoded signal; and
   using a difference between the decoded version of the base encoded signal and the downsampled version of the input signal to produce a first residual signal;
   encoding the first residual signal to produce a first encoded residual signal;
   producing a second residual signal by:
   decoding the first encoded residual signal to produce a first decoded residual signal;
   filtering the first decoded residual signal to produce a filtered version of the first decoded residual signal, wherein the first decoded residual signal includes a first block of decoded residual signal data and a second block of decoded residual signal data, and wherein filtering the first decoded residual signal includes applying a same sized mask to the first block of decoded residual signal data and to the second block of decoded residual signal data;
   correcting the decoded version of the base encoded signal using the filtered version of the first decoded residual signal to create a corrected decoded version;
   upsampling the corrected decoded version; and
   using a difference between the corrected decoded signal and the input signal to produce the second residual signal; and
   encoding the second residual signal to produce a second encoded residual signal,
   wherein the base encoded signal, the first encoded residual signal and the second encoded residual signal comprise an encoding of the input signal.

2. The method according to claim 1, wherein the step of encoding the first residual signal comprises: quantizing the first residual signal to produce a first quantized residual signal and the step of decoding the first encoded residual signal comprises de-quantizing the first quantized residual signal.

3. The A method according to claim 1, wherein the first residual signal comprises a plurality of N×N data blocks and wherein encoding the first residual signal comprises:
   transforming the first residual signal on a block-by-block basis,
   wherein decoding the first encoded residual signal comprises:
   performing an inverse transform on N×N data blocks of a signal derived from the first encoded residual signal to produce the first decoded residual signal, and
   wherein filtering the first decoded residual signal comprises:
   applying an N×N mask to each data block of the first decoded residual signal.

4. The method of claim 3, wherein the step of transforming comprises applying a directional decomposition transform to the first residual signal to create directional components that correspond to the first residual signal.

5. The method according to claim 3, wherein N is 4 and a transform kernel for the transforming is a 4×4 kernel.

6. The method according to claim 3, wherein the mask is a weighted mask, and each coefficient of the mask is a weight between 0 and 1.

7. The method according to claim 3, wherein the mask comprises a set of coefficients surrounding edges of the mask.

8. The method according to claim 3, wherein the mask comprises a first coefficient for sides of the mask and a second coefficient for corners of the mask.

9. The method according to claim 3, wherein N is 4 and the mask is:

| α | β | β | α |
|---|---|---|---|
| β | 1 | 1 | β |
| β | 1 | 1 | β |
| α | β | β | α | wherein α and β and variable coefficients and where $0 \leq \alpha \leq 1$ and $0 \leq \beta \leq 1$.

10. The method according to claim 1, wherein filtering the first decoded residual signal comprises applying an in-loop filter.

11. The method according to claim 1, further comprising:
    signalling coefficients of the mask in configuration metadata accompanying the first or second residual signal or both.

12. A method of decoding an input signal from a plurality of encoded signals, the method comprising:
    receiving a base encoded signal and instructing a decoding of the base encoded signal to produce a base decoded signal;
    receiving a first encoded residual signal and decoding the first encoded residual signal to produce a first decoded residual signal;
    filtering the first decoded residual signal to produce a filtered version of the first decoded residual signal, wherein the first decoded residual signal includes a first block of decoded residual signal data and a second block of decoded residual signal data, and wherein filtering the first decoded residual signal includes applying a same sized mask to the first block of decoded residual signal data and to the second block of decoded residual signal data;
    correcting the base decoded signal using the filtered version of the first decoded residual signal to produce a corrected version of the base decoded signal;
    upsampling the corrected version of the base decoded signal to produce an upsampled signal;
    receiving a second encoded residual signal and decoding the second encoded residual signal to produce a second decoded residual signal; and
    combining the upsampled signal with the second decoded residual signal to produce a reconstructed version of the input signal.

13. The method according to claim 12, wherein the step of decoding the first encoded residual signal comprises applying an inverse quantization operation to the first encoded residual signal.

14. The method according to claim 12, wherein the step of decoding the first encoded residual signal comprises applying an inverse transformation, the inverse transformation being applied on a block-by-block basis, and
    wherein filtering the first decoded residual signal comprises applying an N×N mask to each block of the inverse transformed signal, wherein N×N is a size of a transform kernel used in the inverse transformation, optionally wherein N is 4 and the transform kernel is a 4×4 kernel.

15. The method according to claim 14, wherein the step of inverse transforming comprises applying an inverse directional decomposition transform to directional components of the first encoded residual signal to obtain residual values that correspond to the first residual signal.

16. The method according to claim 14, wherein the mask comprises one or more of:
a set of coefficients surrounding edges of the mask; and
a first coefficient for sides of the mask and a second coefficient for corners of the mask.

17. The method according to claim 14, wherein the mask is one or more of:
a weighted mask and each coefficient of the mask is a weight between 0 and 1; and

| $\alpha$ | $\beta$ | $\beta$ | $\alpha$ |
|---|---|---|---|
| $\beta$ | 1 | 1 | $\beta$ |
| $\beta$ | 1 | 1 | $\beta$ |
| $\alpha$ | $\beta$ | $\beta$ | $\alpha$ | wherein $\alpha$ and $\beta$ and variable coefficients and where $0 \leq \alpha \leq 1$ and $0 \leq \beta \leq 1$.

18. The method according to claim 14, further comprising one or more of:
retrieving coefficients of the mask from configuration metadata, in particular by retrieving the coefficients from a stream header; and
identifying a transform applied to the first residual signal and only applying the mask if the transform is a transform of a predetermined size.

19. An encoding apparatus configured to:
produce a base encoded signal by feeding an encoder with a downsampled version of an input signal;
produce a first residual signal by:
obtaining a decoded version of the base encoded signal; and
using a difference between the decoded version of the base encoded signal and the downsampled version of the input signal to produce a first residual signal;
encode the first residual signal to produce a first encoded residual signal;
produce a second residual signal by:
decoding the first encoded residual signal to produce a first decoded residual signal;
filtering the first decoded residual signal to produce a filtered version of the first decoded residual signal, wherein the first decoded residual signal includes a first block of decoded residual signal data and a second block of decoded residual signal data, and wherein filtering the first decoded residual signal includes applying a same sized mask to the first block of decoded residual signal data and to the second block of decoded residual signal data;
correcting the decoded version of the base encoded signal using the filtered version of the first decoded residual signal to create a corrected decoded version;
upsampling the corrected decoded version; and
using a difference between the corrected decoded signal and the input signal to produce the second residual signal; and
encode the second residual signal to produce a second encoded residual signal,
wherein the base encoded signal, the first encoded residual signal and the second encoded residual signal comprise an encoding of the input signal.

20. A decoding apparatus configured to:
receive a base encoded signal and instructing a decoding of the base encoded signal to produce a base decoded signal;
receive a first encoded residual signal and decoding the first encoded residual signal to produce a first decoded residual signal;
filter the first decoded residual signal to produce a filtered version of the first decoded residual signal, wherein the first decoded residual signal includes a first block of decoded residual signal data and a second block of decoded residual signal data, and wherein filtering the first decoded residual signal includes applying a same sized mask to the first block of decoded residual signal data and to the second block of decoded residual signal data;
correct the base decoded signal using the filtered version of the first decoded residual signal to produce a corrected version of the base decoded signal;
upsample the corrected version of the base decoded signal to produce an upsampled signal;
receive a second encoded residual signal and decoding the second encoded residual signal to produce a second decoded residual signal; and
combine the upsampled signal with the second decoded residual signal to produce a reconstructed version of the input signal.

* * * * *